US008176683B2

(12) United States Patent
Holmes

(10) Patent No.: US 8,176,683 B2
(45) Date of Patent: May 15, 2012

(54) VEHICLE DOOR

(75) Inventor: Leo Monte Holmes, Goshen, IN (US)

(73) Assignee: Dexter Chassis Group, Inc., White Pigeon, MI (US)

( * ) Notice: Subject to any disclaimer, the term of this patent is extended or adjusted under 35 U.S.C. 154(b) by 178 days.

(21) Appl. No.: 12/660,569

(22) Filed: Mar. 1, 2010

(65) Prior Publication Data

US 2011/0209409 A1    Sep. 1, 2011

(51) Int. Cl.
*B60J 5/04* (2006.01)
(52) U.S. Cl. ............... 49/503; 49/70; 49/501; 296/156
(58) Field of Classification Search ............ 49/70, 501, 49/503; 52/309.9, 784.1, 784.15, 784.16, 52/794.1
See application file for complete search history.

(56) References Cited

U.S. PATENT DOCUMENTS

| 624,981 | A * | 5/1899 | Rosenblatt | 190/109 |
|---|---|---|---|---|
| 3,039,291 | A * | 6/1962 | Dusing et al. | 70/451 |
| 3,513,674 | A * | 5/1970 | Rutherford | 70/451 |
| 4,139,999 | A * | 2/1979 | Allenbaugh | 70/452 |
| 4,218,848 | A * | 8/1980 | Nelson | 49/503 |
| 4,265,067 | A * | 5/1981 | Palmer | 52/309.9 |
| 5,172,519 | A * | 12/1992 | Cooper | 49/400 |
| 5,218,807 | A * | 6/1993 | Fulford | 52/455 |
| 5,222,287 | A * | 6/1993 | Cooper | 29/401.1 |
| 5,743,057 | A * | 4/1998 | Martin | 52/457 |
| 5,906,493 | A * | 5/1999 | Bishop | 434/226 |
| 6,079,766 | A | 6/2000 | Butler et al. | 296/146.5 |
| 6,334,277 | B1 | 1/2002 | Condino | 49/381 |
| 6,688,063 | B1 * | 2/2004 | Lee et al. | 52/455 |
| 6,793,270 | B2 | 9/2004 | van der Vegt et al. | 296/156 |
| 6,860,082 | B1 * | 3/2005 | Yamamoto et al. | 52/794.1 |
| 2002/0092264 | A1 * | 7/2002 | Larson et al. | 52/784.1 |
| 2005/0076576 | A1 * | 4/2005 | Rijn et al. | 49/504 |
| 2009/0038233 | A1 * | 2/2009 | Aaron et al. | 49/502 |

OTHER PUBLICATIONS

David K. Doran, "Construction Materials Reference Book", article,1992, pp. 41/2-4/4, Butterworth-Heinemann Ltd., Oxford, UK.

* cited by examiner

*Primary Examiner* — Katherine W Mitchell
*Assistant Examiner* — Justin Rephann
(74) *Attorney, Agent, or Firm* — J. A. Thurnau, Esq.; T. A. Dougherty, Esq.; P. N. Dunlap, Esq.

(57) ABSTRACT

A vehicle door comprising a first outer layer (70) and second outer layer (80), a foam portion (90) disposed between the first outer layer and the second outer layer, a compartment comprising a first outer member (10) and a second outer member (20) in parallel spaced relation, the first outer member and the second outer member joined by at least one intermediate member (30) having a flexible crease (32), a receiving cavity (A) disposed outwardly of the compartment for engaging the foam portion, the first outer member and the second outer member each disposed substantially flush with a foam portion outer surface (91,92), and the foam portion and the compartment disposed between the first outer layer and the second outer layer.

6 Claims, 3 Drawing Sheets

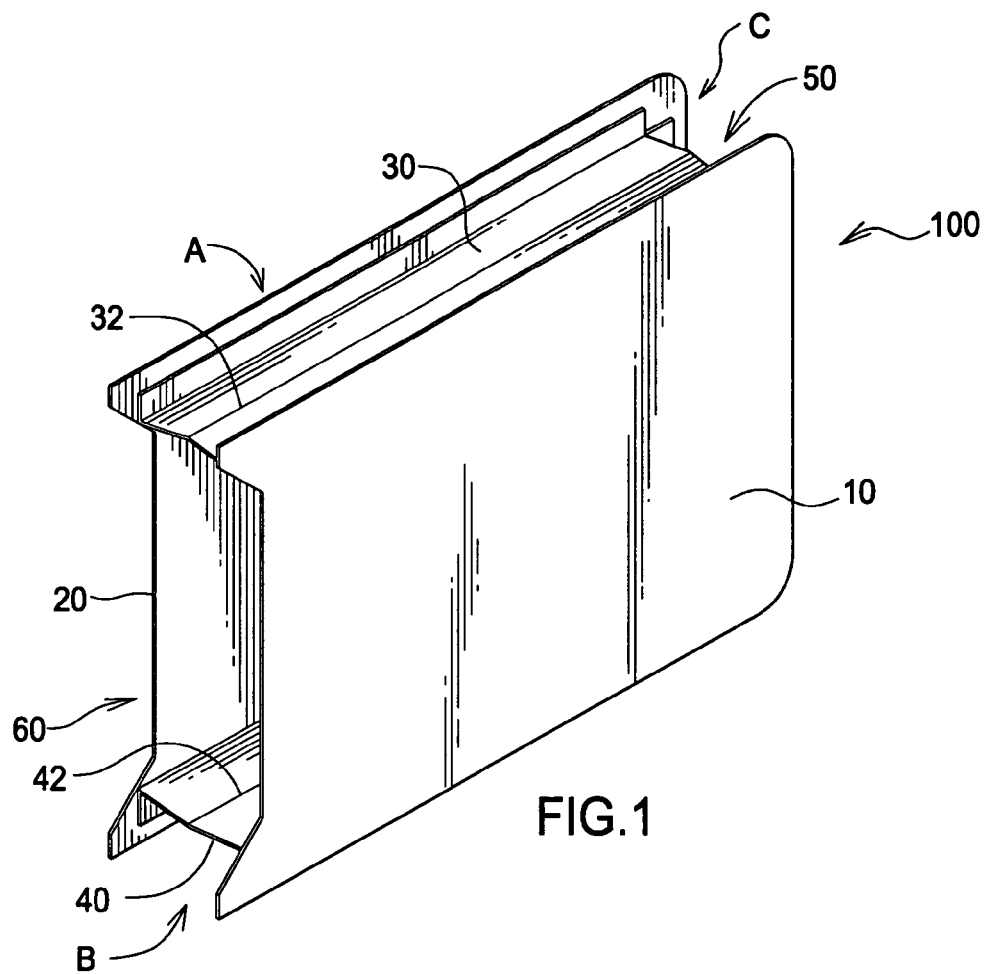
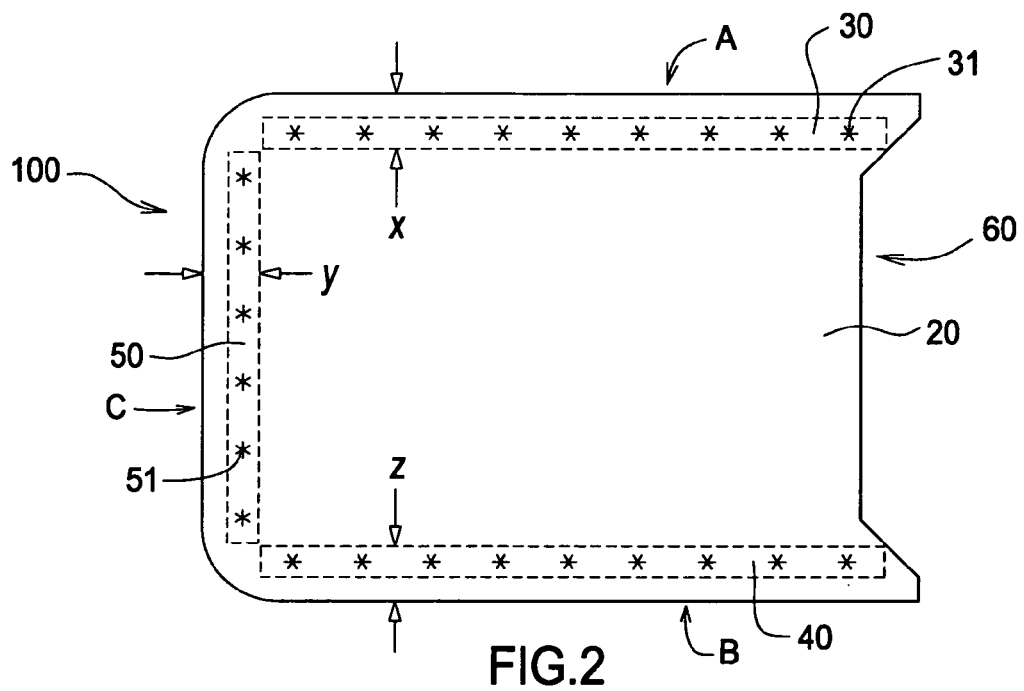

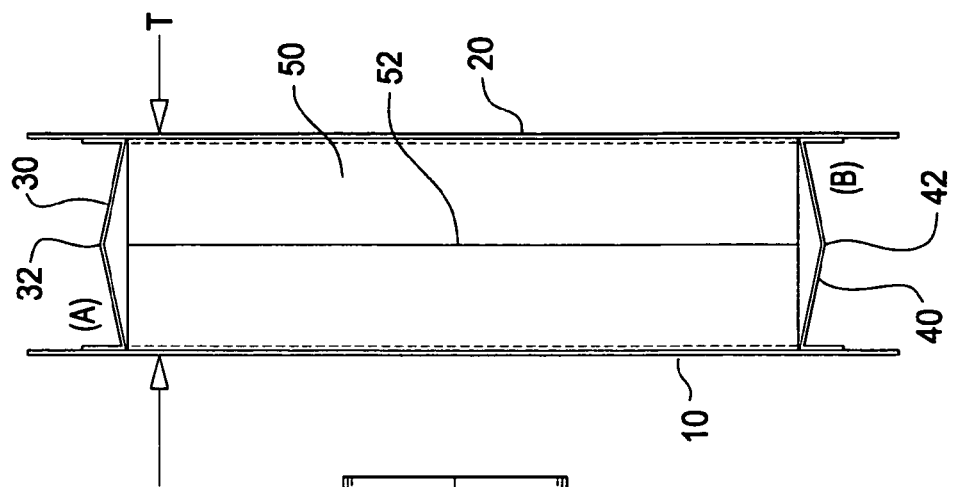
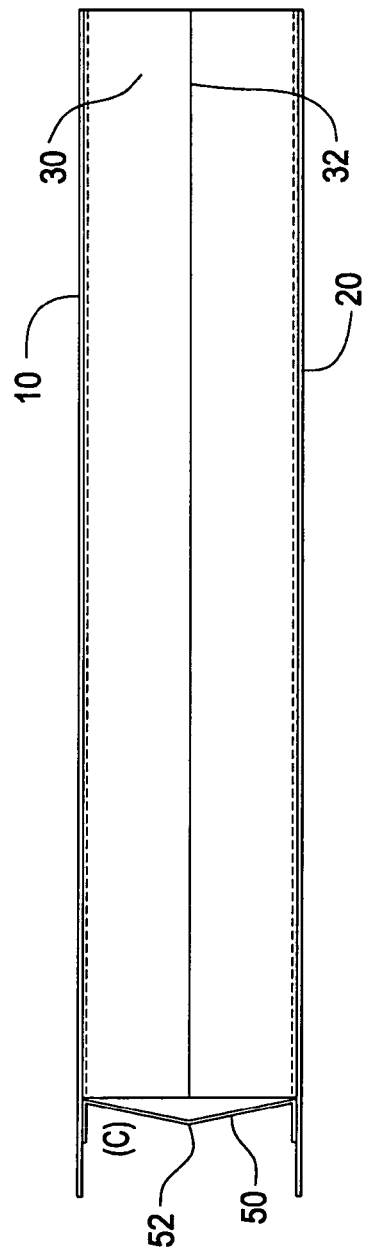

VEHICLE DOOR

FIELD OF THE INVENTION

The invention relates to a vehicle door, and more particularly, to a vehicle door comprising a compressible compartment having a first outer member and a second outer member in parallel spaced relation, the first outer member and the second outer member joined by a member having a flexible crease, a receiving cavity disposed outwardly of the compressible compartment for receiving the foam portion, the first outer member and the second outer member each disposed substantially flush with a foam portion outer surface.

BACKGROUND OF THE INVENTION

Each year thousands of vacationers venture across the countryside in recreational vehicles (RV's). Many RV's incorporate all of the luxuries of a permanent residence. RV's usually comprise full bathrooms, sleeping quarters, kitchens with sinks, stoves and microwave ovens.

Exterior doors for recreational vehicles have many inadequacies. Currently available doors have many pieces that require labor intensive manufacturing and assembly processes. These doors consequently are expensive for the consumer. Many small parts also increase chances for mechanical failure.

Expense and fragility are not the only problems associated with currently available RV doors. Some exterior doors have exposed hardware, bulky profiles or seams that cause additional problems and which detract from the appearance of the door and vehicle. They can also increase the vehicle's overall coefficient of drag, which reduces fuel economy. Seams can leak.

Representative of the art is U.S. Pat. No. 6,334,277 which discloses a door assembly for a recreational vehicle has a molded mounting frame and a molded flange. The mounting frame and the door have integral hinge pin lugs. Spring-loaded hinge pins are captured within the hinge pin lugs and allow the door to swing open or close. A latch secures the door assembly in a closed position. The door may be thermally insulated. The hinge pins may be stainless steel. The latch may be a locking mechanism. The door securely conceals the door frame fasteners when the door assembly is in the closed position. One hinge pin may be fixed to one hinge pin lug.

What is needed is a vehicle door comprising a compressible compartment having a first outer member and a second outer member in parallel spaced relation, the first outer member and the second outer member joined by a member having a flexible crease, a receiving cavity disposed outwardly of the compartment for receiving the foam portion, the first outer member and the second outer member each disposed substantially flush with a foam portion outer surface. The present invention meets this need.

SUMMARY OF THE INVENTION

The primary aspect of the invention is to provide a a vehicle door comprising a compressible compartment having a first outer member and a second outer member in parallel spaced relation, the first outer member and the second outer member joined by a member having a flexible crease, a receiving cavity disposed outwardly of the compartment for receiving the foam portion, the first outer member and the second outer member each disposed substantially flush with a foam portion outer surface.

Other aspects of the invention will be pointed out or made obvious by the following description of the invention and the accompanying drawings.

The invention comprises a vehicle door comprising a first outer layer and second outer layer, a foam portion disposed between the first outer layer and the second outer layer, a compressible compartment comprising a first outer member and a second outer member in parallel spaced relation, the first outer member and the second outer member joined by at least one intermediate member having a flexible crease, a receiving cavity disposed outwardly of the compressible compartment for engaging the foam portion, the first outer member and the second outer member each disposed substantially flush with a foam portion outer surface, and the foam portion and the compressible compartment disposed between the first outer layer and the second outer layer.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 1 is a perspective view of the vehicle door compartment.

FIG. 2 is a side view of the vehicle door compartment.

FIG. 3 is a top plan view of the vehicle door compartment.

FIG. 4 is a side elevation view of the vehicle door compartment.

DETAILED DESCRIPTION OF THE PREFERRED EMBODIMENT

Figure 6:
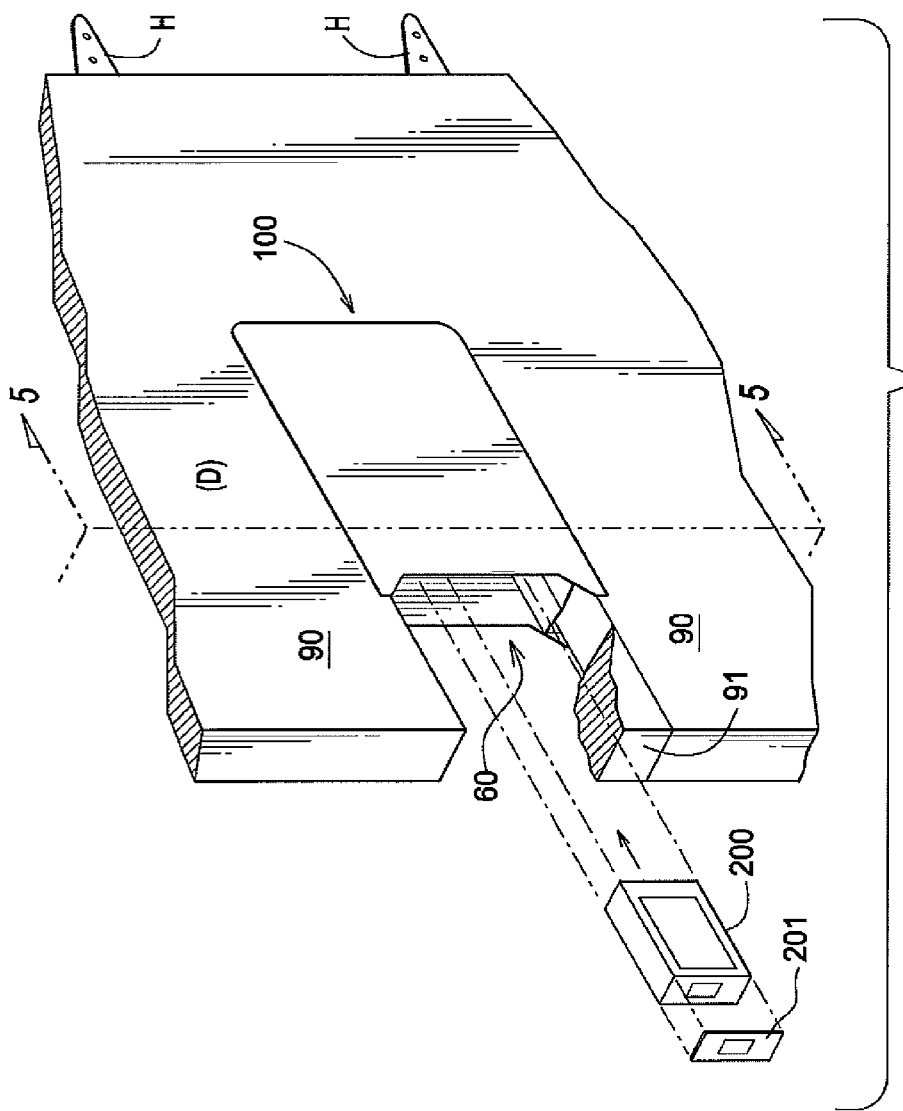
FIG. 6 is a perspective view of the vehicle door.

FIG. 1 is a perspective view of the vehicle door compartment. The compressible compartment 100 comprises a planar member 10 and planar member 20. Planar member 10 is held in parallel spaced relation to planar member 10 by a member 30, member 40 and member 50. The compartment further comprises an opening 60 at an end whereby mechanism(s) can be installed within the compartment.

For example, a power lock solenoid, receiver, and so on can be installed inside the compartment, see FIG. 6. When the vehicle door is assembled and run through rollers to apply the hot glue and press on the member 10 and member 20, the compartment becomes perfectly flush with the foam core of the vehicle door. Hence, any dimpling that may have been present in the skin of the vehicle door from the mechanicals in the prior art is not evident in the inventive door.

FIG. 2 is a side view of the vehicle door compartment. Member 30 is fastened to planar member 10 and planar member 20 by use of a hot melt tack or adhesive 31. Member 40 is fastened to planar member 10 and planar member 20 by use of a hot melt tack or adhesive 41. Member 50 is fastened to planar member 10 and planar member 20 by use of a hot melt tack or adhesive 51.

Member 30 is recessed from the edge of member 10 by a distance x. Member 40 is recessed from the edge of member 10 by a distance z. Member 50 is recessed from the edge of member 10 by a distance y. Each recess forms a receiving cavity A, B, C respectively, into which foam is inserted during vehicle door assembly.

FIG. 3 is a top plan view of the vehicle door compartment. Member 30 comprises a crease 32. Member 40 comprises a crease 42. Member 50 comprises a crease 52. Creases 32, 42, 52 provide flexibility in the thickness T of the compartment to accommodate variations in a vehicle door thickness during assembly.

FIG. 4 is a side elevation view of the vehicle door compartment.

Figure 5:
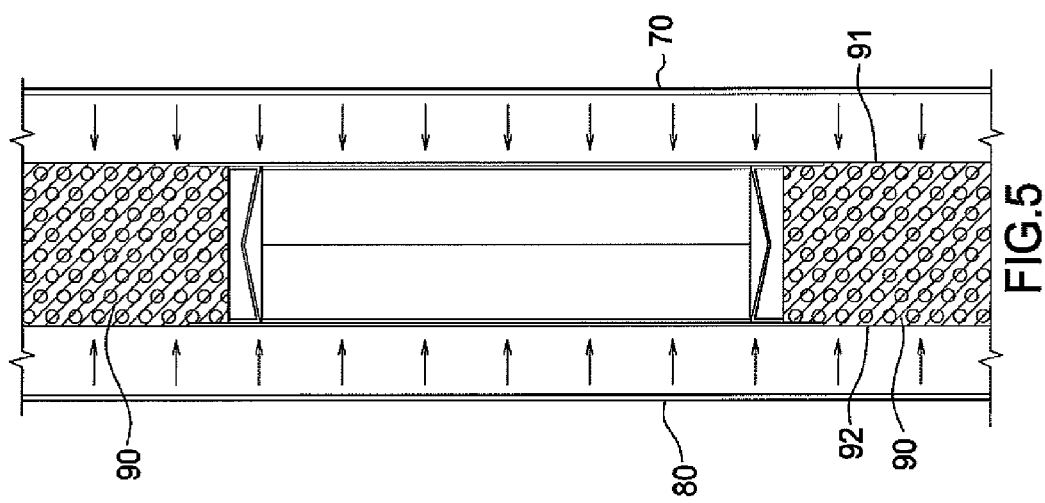
FIG. 5 is a cross-sectional detail of the vehicle door at 5-5 in FIG. 6.

FIG. 5 is a cross-sectional detail of the vehicle door at 5-5 in FIG. 6. To assemble a vehicle door, each cavity A, B, C in the compartment 100 is engaged with or inserted into foam 90. Foam 90 typically comprises Styrofoam®, but may also comprise any suitable compressible material. Foam portion 90 comprises the core of the door and also serves to insulate the door from heat and cold.

Next, the compressible compartment 100 is partially compressed so the members 10 and 20 are flush with the outer surface (91,92) of the foam 90. After the partial compression, rebound in the foam and flexibility from the creases 32, 42, 52 causes the outer surface of the foam to become flush with the edges of members 10, 20. By doing so the edges of each member 10, 20 are not telegraphed through the vehicle door skin or covering panels 70, 80. After the compartment is installed in the foam the door outer covering panels 70, 80 are installed as a laminate over the foam and compartment.

After compression there is some clearance in cavity A, B, C, between each crease 32, 42, 52 and foam 90 such that each member 30, 40, 50 may flex alone each crease 32, 42, 52 respectively.

FIG. 6 is a perspective view of the vehicle door. Compartment 100 is installed in the foam 90 within a vehicle door (D), shown in partial view. Mechanisms can now be installed through opening 60. Once the mechanisms are installed opening 60 is close using a foam piece 91.

The mechanism can include a handle, latch 200 and striker 201 (each known in the art) which are installed into the door (D) and door jamb (not shown). The vehicle door (D) further comprises components known in the art, such as hinges (H) for attaching the door to a vehicle wall.

Although a form of the invention has been described herein, it will be obvious to those skilled in the art that variations may be made in the construction and relation of parts and method without departing from the spirit and scope of the invention described herein.

I claim:

1. A vehicle door comprising:
    a first outer layer (70) and second outer layer (80);
    a foam portion (90) disposed between the first outer layer and the second outer layer;
    a compressible compartment comprising a first outer member (10) and a second outer member (20) in parallel spaced relation, the first outer member and the second outer member joined by at least one intermediate member (30) having a flexible crease (32), a receiving cavity (A) disposed outwardly of the compressible compartment for engaging the foam portion, the first outer member and the second outer member each disposed substantially flush with a foam portion outer surface (91,92); and
    the foam portion and the compressible compartment disposed between the first outer layer and the second outer layer.

2. The vehicle door as in claim 1, wherein the compressible compartment further comprises an opening for receiving a mechanism.

3. The vehicle door as in claim 1 further comprising a door latch mechanism.

4. The vehicle door as in claim 2 further comprising;
    a second intermediate member (40) and a third intermediate member (50) each disposed between the first outer member (10) and the second outer member (20);
    the second intermediate member (40) having a flexible crease (42); and
    the third intermediate member (5) having a flexible crease (52).

5. The vehicle door as in claim 4 further comprising:
    a second receiving cavity (B) disposed outwardly of the compressible compartment for engaging the foam portion; and
    a third receiving cavity (C) disposed outwardly of the compartment for engaging the foam portion.

6. The vehicle door as in claim 5 further comprising a hinge.

* * * * *